United States Patent [19]
Smith et al.

[11] Patent Number: 4,848,407
[45] Date of Patent: Jul. 18, 1989

[54] PIPELINE REHABILITATION METHOD UTILIZING ARTICULATED GASKETED-JOINT PIPE

[75] Inventors: Harold R. Smith, Roswell; Eric E. Kemp, Alpharetta, both of Ga.

[73] Assignee: Chevron Research Company, San Francisco, Calif.

[21] Appl. No.: 131,963

[22] Filed: Dec. 11, 1987

Related U.S. Application Data

[63] Continuation-in-part of Ser. No. 068,071, Jun. 30, 1987, abandoned.

[51] Int. Cl.⁴ ............................................. F16L 01/00
[52] U.S. Cl. ....................................... 138/97; 405/150
[58] Field of Search ..................... 138/96, 97, 98, 105; 285/918; 405/150, 154; 264/36

[56] References Cited

U.S. PATENT DOCUMENTS

| | | | |
|---|---|---|---|
| 1,976,589 | 10/1934 | Trickey | 285/918 X |
| 3,950,461 | 4/1976 | Levens | 264/46.5 |
| 4,170,248 | 10/1979 | Bennett et al. | 138/97 |
| 4,504,171 | 3/1985 | Florence | 405/154 |
| 4,510,004 | 4/1985 | Hawerkamp | 138/122 X |
| 4,619,555 | 10/1986 | Skinner et al. | 138/97 X |
| 4,626,134 | 12/1986 | Coumont | 405/184 |

FOREIGN PATENT DOCUMENTS

116733  9/1979  Japan ..................................... 138/97

*Primary Examiner*—James E. Bryant, III

[57] ABSTRACT

A method of rehabilitating buried pipelines by the introduction of a particular liner pipe comprising sections of polyethylene pipe connected by articulated gasketed joints of bell and spigot design which are specifically adapted for ease of lining large diameter pipeliner with minimum disruption to surface traffic and pipeline flow.

6 Claims, 4 Drawing Sheets

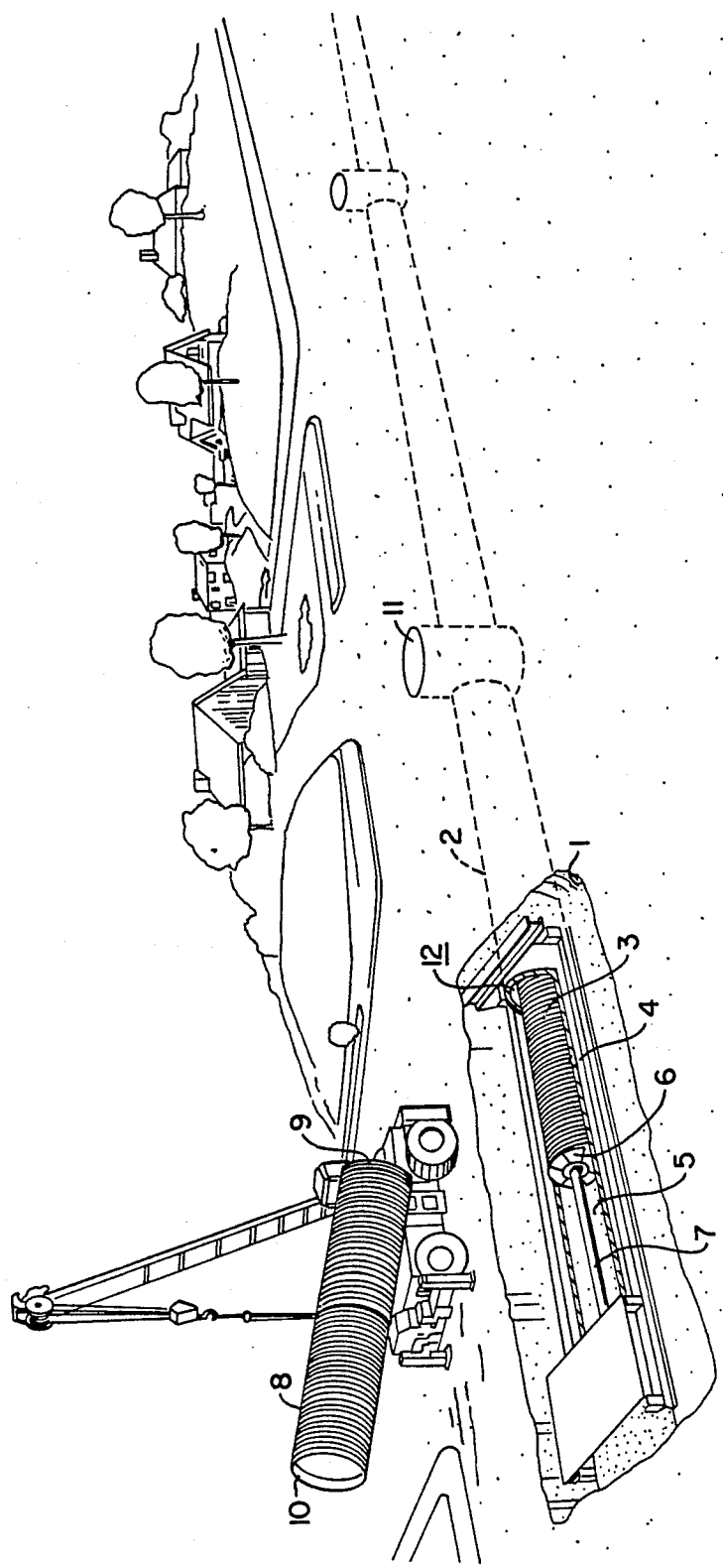
FIG._1.

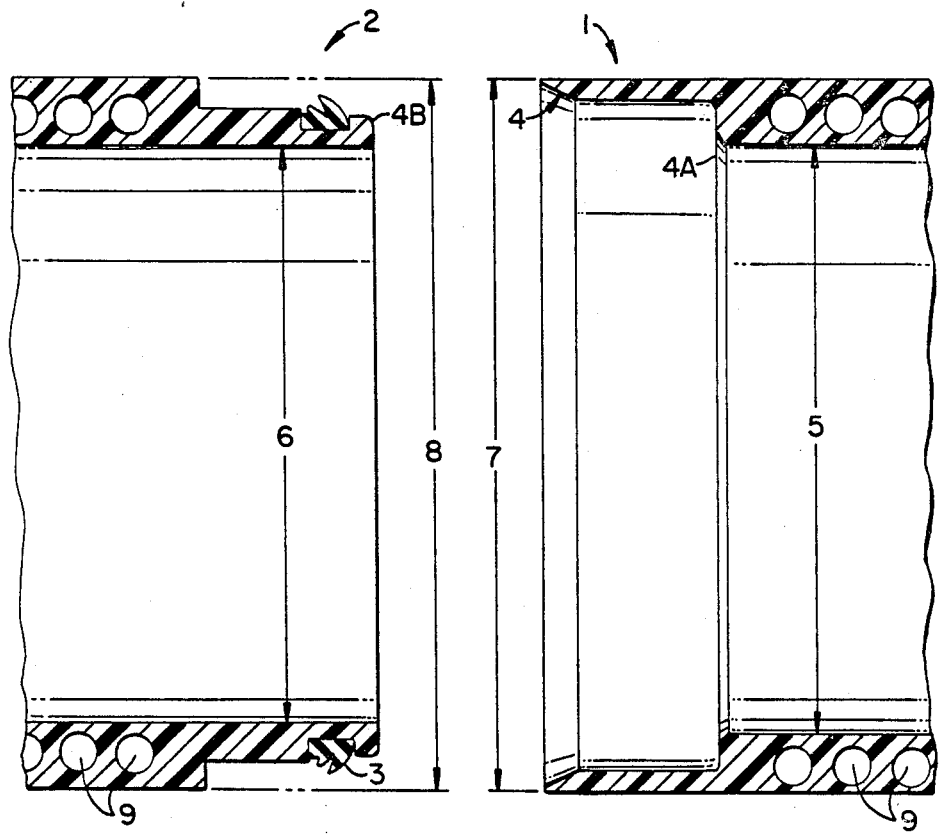
FIG._2B. FIG._2A.
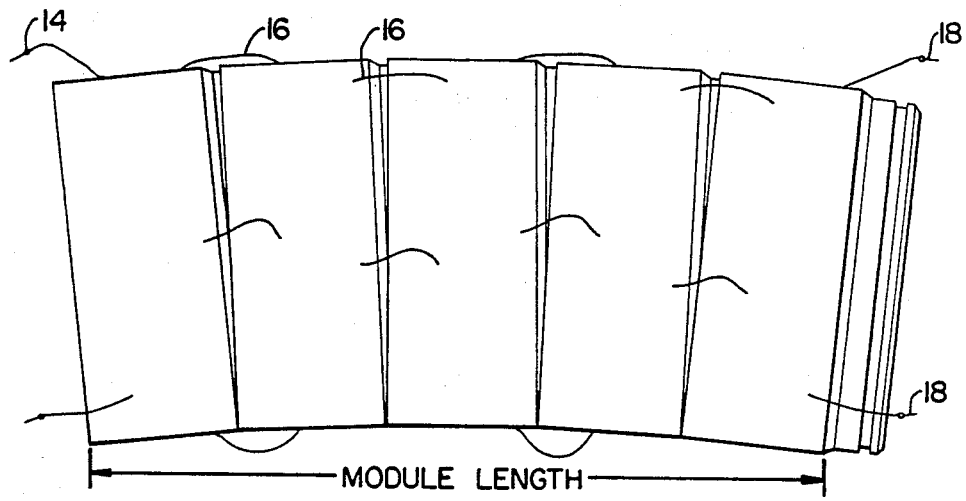
FIG._3.

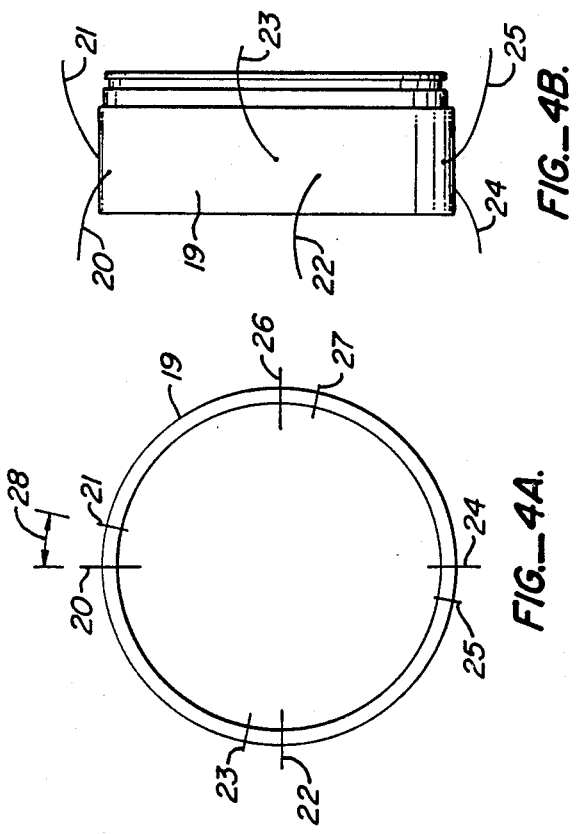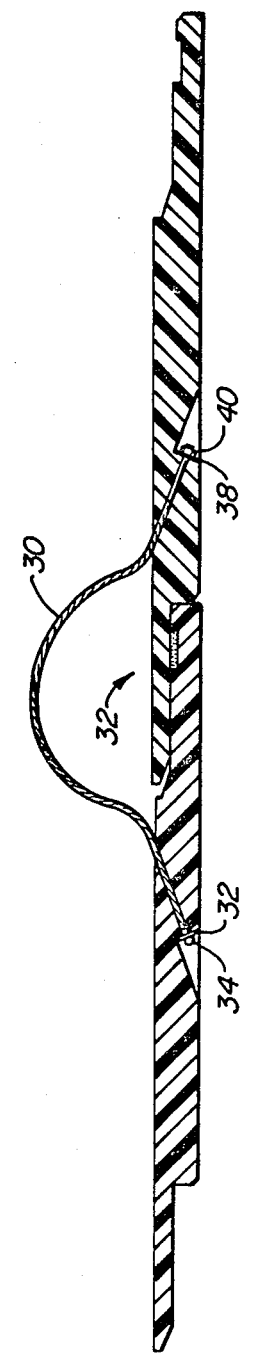

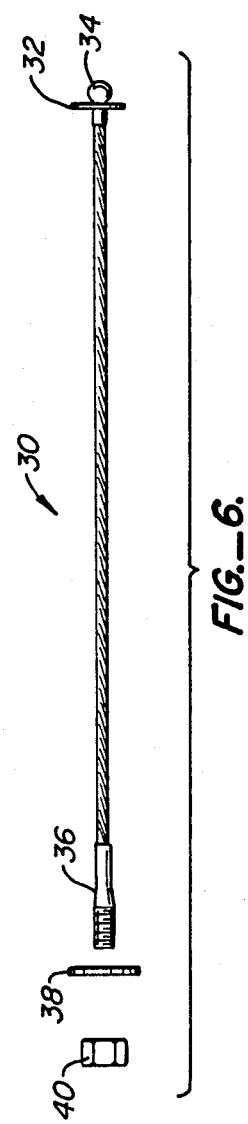

4,848,407

PIPELINE REHABILITATION METHOD UTILIZING ARTICULATED GASKETED-JOINT PIPE

CROSS-REFERENCE TO RELATED APPLICATIONS

This application is a continuation-in-part of application Ser. No. 068,071, filed June 30, 1987 now abandoned.

BACKGROUND OF THE INVENTION

The present invention relates to the complete rehabilitation of buried pipelines, such as sewer lines, drainage lines, water mains, and the like. More particularly, the present invention relates to the complete rehabilitation over long distances of very large diameter curved and buried pipelines. According to the method of the present invention, such rehabilitation is achieved without digging up a substantial portion of the buried pipeline.

In the past it was common to use buried cement, iron, masonry, or clay conduits to convey sewage, drainage, and other materials. Of course these systems decay over a period of years due to deterioration or corrosion, root action, and ground movement. The conventional method of repair is to excavate the faulty buried pipeline and replace such portions as are necessary. The disadvantages of such excavations are the disruptions of neighborhoods, roads, and streets caused by trenches of from 6 to 30 feet in depth. More particularly, the sewer service, or other service, is completely disrupted unless expensive bypasses are constructed.

It has been suggested heretofore, for example, in U.S. Pat. No. 3,950,461, that the disadvantages of excavation could be overcome by the insertion of a flexible continuous liner into the pipeline from a convenient access point. In the prior art method, a continuous liner is pushed through the length of the pipeline to another access point, perhaps spanning distances as long as 1500 feet. The annular space between the liner and the inner surface of the buried pipeline would be filled with cements, e.g., U.S. Pat. No, 4,170,248.

Unfortunately, in many applications the liner for the underground pipes has very thick walls and is difficult to bend. To insert a stiff liner, it may be necessary to greatly elongate the excavation so that the stiff liner may be gradually deformed into a curve of large radius. But this is again a disadvantageous disruption of traffic at great cost. The use of bending devices as taught in U.S. Pat. No. 4,504,171 for sliplining by continuous plastic liners is not practical on pipes of large diameter and substantial wall thicknesses.

The present invention solves the problem of rehabilitating large diameter buried pipelines by discarding the prior art's flexible continuous or semicontinuous pipeliners and adopting a segmented pipeline liner. A segmented pipeline liner requires joints between its segments. The joints used in the process of the present invention are specifically designed for ease of entry into the buried pipeline over long distances, and can be specifically designed (i.e., articulated) for lining curved pipelines having radii of curvature even less than 50 feet.

Surprisingly, it has been found that these properties are attainable with jointed high density polyethylene liner pipe section produced by the helical winding of polyethylene strips and reinforcing members on a rotating mandrel.

SUMMARY OF THE INVENTION

A method of buried pipeline rehabilitation utilizing a sectional polyethylene liner pipe with gasketed joints between sections thereof, said joints being composed of a bell formed in the opposing end of each section of said liner pipe, and an annular gasket joining each said bell and spigot, wherein the inner diameter of each of said joints is equal to the inner diameter of said liner pipe, the outer diameter of each of said joints is equal to the outer diameter of said liner pipe, and the outer diameter of said liner pipe is less than the inner diameter of said buried pipeline, said method comprising the steps of:

(a) creating an access pit by uncovering a portion of said buried pipeline and removing only that fraction of said portion of said pipeline which is approximately above the springline of said pipeline, thereby leaving the invert of said portion of said pipeline to convey the pipeline flow while rehabilitation proceeds;

(b) inserting said sectional polyethylene liner pipe section-by-section into said invert with bell opposing spigot, and allowing each inserted section to convey said pipeline flow;

(c) pushing each of said inserted sections into said buried pipeline to form said gasketed joints and advance said polyethylene liner pipe into said buried pipeline; and (d) injecting grout under pressure into the annular space between said polyethylene liner pipe and said buried pipeline.

A liner pipe section consisting of a module comprising several segments of liner pipe joined to each other by articulated gasketed joints, the segments of which are linked by several cables across each joint to prevent overarticulation. The modules are joined at the construction site to form the polyethylene liner pipe of low profile.

BRIEF DESCRIPTION OF THE DRAWINGS

FIG. 1 shows a typical sewer pipe rehabilitation by sectional polyethylene liner pipe installation.

FIGS. 2A and 2B show a cross-sectional view of the gasketed joint of bell and spigot used in the method of the present invention.

FIG. 3 shows a ten foot sectional module composed of five segments of liner pipe to provide articulation, and restraining cables to prevent overarticulation.

FIGS. 4A and 4B show the positioning of the restraining cables on the circumference of the liner pipe segment.

FIG. 5 shows detail of the restraining cable's connection across a gasketed joint shown in a crosssection.

FIG. 6 shows a single restraining cable in detail.

DETAILED DESCRIPTION OF PREFERRED EMBODIMENTS

In the preferred method of the present invention, sections of polyethylene liner pipe as short as a few feet in length are joined together by articulated bell and spigot joints of uniform outer diameter to provide a pipeline rehabilitation liner pipe of great strength and flexibility in any diameter, including very large diameter pipes.

In a typical installation, the purpose of the project will be to rehabilitate currently failing sewer systems. The rehabilitated system when grouted in place will be structurally independent, leak-proof, and highly corrosion-resistant. The lining operation utilizing high density polyethylene gasketed liner pipe will be accomplished while maintaining the uninterrupted flow in the existing pipeline. Bypass pumping will not be necessary. At no time during the insertion of the liner pipe will there be an obstruction to the existing full flow capacity in excess of approximately 10%.

All sewer lines to be lined shall be cleaned using standard mechanically powered or hydraulically propelled cleaning tools. All dirt, grease, rocks, roots, and other deleterious materials and obstructions will be removed from the sewer lines and manholes which would prevent the passage of inspection equipment or liner pipe sections. All solid materials resulting from the cleaning will be removed at the upstream or downstream manhole of the section being cleaned.

The liner pipe of the present invention will be described in terms of the preferred polyethylene material, but any thermoplastic material capable of being fashioned and used in the described manner will find use within the scope of the invention.

The polyethylene liner pipe used for lining the pipeline will normally be constructed of high density polyethylene and is characterized by gasketed joints of substantially the same outer diameter as the outer diameter of the polyethylene liner pipe. The outer diameter of such polyethylene liner pipe can range from 18 through 120 inches or greater. The liner pipe is manufactured by the continuous winding of a high density polyethylene profile onto suitably sized mandrels produced to constant internal diameters. The liner pipe wall profile is designed and manufactured to independently withstand the particular service requirements and parameters of soil density, loading, maximum depth of soil covering, maximum grouting pressure, maximum jacking force, etc., as specified by local conditions and code requirements. Methods of manufacture of such liner pipe are disclosed in U.S. Pat. Nos. 4,466,854 and 4,510,004, the disclosures of which are herein incorporated by reference.

Apart from the structural voids and hollows which are naturally associated with the profile of all designs of the polyethylene pipeliner, all pipe and fittings are homogenous throughout and free from visual cracks, holes, foreign inclusions, or other injurious defects. The liner pipe is uniform in color, opacity, density, and other physical properties with smooth walls, both on the inside and outside of the pipe. In general, the contractor determines the number and location of access pits required for the insertion of the liner pipe. The number of access pits is confined to the minimum required and shall be as small as possible to avoid disrupting traffic and other normal surface activities. Normally, the pit is less than 35 feet long and 10 feet wide at the springline of the existing pipe. The existing pipe is uncovered as necessary to a point below its springline. The top of the existing pipe is cut out for the length required down to a point slightly below its springline. Exposed edges of the pipe remaining are neatly trimmed as required for the insertion operation. At no place is the full circumference of the existing pipe removed. The bottom is to remain in place to conduct sewage flow, cradle the liner pipe during insertion, and to provide a foundation for the liner pipe. When the insertion is complete at each pit, the exposed liner, fittings, and insertion opening in the pipeline are capped with a minimum thickness of 12 inches of concrete. Back-fill and surface restoration are as specified.

Liner pipe grade is maintained equal to the grade of the sewer pipeline being relined. This will assure that sewage flow is maintained. The liner pipe is maintained in contact with the invert of the existing sewer. As the work progresses, the interior of the pipe is cleared of all dirt and debris. The liner pipe is inserted into the pipeline utilizing equipment, such as a hydraulic- or cable-operated winching pipe pusher device which exerts pressure on the liner pipe. The machine operator must closely and continuously monitor and control the jacking load imposed on the liner pipe. A jacking ring or device may be used to distribute the jacking load evenly on the entire surface perimeter of the end of the liner pipe. Joints are made up by shoving the bell and spigot together while the joint is in full view of the operator and inspectors.

An aqueous solution of bentonite may be used as a lubricant between the casing of the pipeline and the liner pipe to minimize the jacking load. For each section to be lined, insertion is in one continuous operation until the planned termination point is reached. Total jacking loads shall not exceed the manufacturer's recommendations, and the contractor provides a suitable means of measuring jacking loads and monitors the load as the liner pipe is installed. If at any time the load appears to rise nonuniformly, indicating possible obstruction of the pipeline, jacking operations are terminated and the obstruction or other impediment removed before continuing.

Portions of the pipeline being lined may have curves with a radius of curvature less than 700 feet. Even S-curves may be easily lined. However, the pipeliner manufacturer should be consulted to provide sections of short length commensurate with smaller radii of curvature. It is not recommended that the joints be flexed in excess of about 20° angular deflection. Angular deflection is measured as the angle between the longitudinal axes of adjacent segments of pipeliner. Preferably, the angular deflection should not exceed about 12°. Preferably, no curved portion of the buried pipeline will have a radius of curvature less than about 20 feet. Typically, the buried pipelines rehabilitated in accordance with this invention will have curved portions with a radius of curvature in the range of about 10–700 feet or more. The liner pipe of the present invention is advantageously adapted, even in large diameter, for lining buried pipelines having curved portions and even S-curved portions.

In a preferred embodiment of this invention the lining of highly curved piping systems is made practical by the use of modules of highly articulated pipe. Such modules are also referred to as "sections" in the method of the present invention. The modules are composed of a plurality of short sections or "segments" of liner pipe joined by articulated bell and spigot joints with gaskets, as heretofore described. To insure that no joint is lost due to overarticulation during lining, it is preferred to use a restraining cable system to act as an overarticulation block. The module is preferably formed at the factory with restraining cables in place. End cables may be linked at the site to adjacent modules (sections) or longer liner pipe lengths. Consequently, the sections inserted in a curving buried pipeline may comprise modules composed of several shorter segments of previously bell and spigot joined liner pipe, each said shorter segment of liner pipe linked to its adjacent segment of liner pipe in said module by several restraining cables. The restraining cables are disposed around the circumference of each said segment to prevent overarticulation. The low profile cables do not impede relining. The cable system can withstand more than 3,000 psi in a tensile test.

The liner pipe at manhole entrances is cut out as required after insertion and grouting. The method of cutting is as required to leave a smooth and clean plastic edge. The liner pipe may be suitably blocked during grouting so that no deviation from parallel-sighted channel occurs at the manhole. Grout is normally a mixture of 75% pozzolanic fly ash with 25% cement plus a high grade gel to control the bleeding and a dispersant to lower the viscosity for increased pumpability. Coarse sand and/or aggregate shall normally not be used. The 28-day compressive strength test will yield at least 1500 psi, reference ASTM C-109-84. The mixed grout has a low slurry viscosity in the range of about 500 to 1500 cp at 5.1/second. Slurry density of the mixed grout is at least 12.5 pounds per gallon.

DESCRIPTION OF THE DRAWINGS

FIG. 1 displays the lining process of the present invention in gross. First, an excavation 1 is dug to expose a section of the buried pipeline shown in outline 2. Next, an upper section of the pipeline is cut away to a point above the springline 4 exposing the invert 5 which continues to convey the pipeline flow without major disruption. A liner pipe section of helically wound polyethylene pipe 3 is shown being jacked into the buried pipeline using hydraulic jack piston 7 and jacking ring 6. Another section of liner pipe 8 is being readied for positioning into the invert 5, said section having bell 10 and spigot 9 with an annular gasket in place. The spigot 9 will be positioned in opposition to the bell of section 3 and the joint completed in full view by jacking section 8 against section 3. After completion of the lining of a length of pipeline, grout is injected to fill the annular space 12 at convenient points along the length of the pipeline. Manhole 11 openings into the liner pipe should also be completed. Finally, the excavation 1 is cemented over.

FIG. 2 shows a cross-sectional view of the articulated gasketed joint of the present invention. A bell 1 having beveled lip 4 and 4A is joined to a spigot 2 having flexible annular gasket 3 and beveled lip 4B, by slipping said bell over said spigot thereby permitting said gasket to flexibly seal the joint from both liquid ingress and egress. The articulated joint is characterized by substantial angular deflection without loss of liquid seal. The joint is also characterized by the formation of a smooth inner wall and outer wall at the joint because the internal diameters 5 and 6 are substantially the same, and the outer diameters 7 and 8 are substantially the same. The voids 9 indicate the helically wound nature of the polyethylene liner pipe made from helically wound reinforcing ribs of hollow plastic hose.

FIG. 3 shows a ten foot sectional module composed of five sections or segments of liner pipe to provide greater articulation than is available from long lengths of liner pipe. Each segment of the module is joined to the neighboring segment by the bell and spigot gasketed joint previously described. The pipe of the present invention, in its preferred embodiments, has such short segments linked at the factory by restraining cables as shown in FIG. 3. At least 2, preferably 3, and possible more, short lengths of restraining cable link the segments into a module. Several cables are shown unlinked at each end of the module for linking to adjacent modules, or longer pipe lengths, to make up the pipeline at the site.

The purpose of the restraining cables is to prevent overarticulation, and eventually, opening of a joint from leak-proof fit to an adjacent pipe section. The loss of even one joint during insertion into a curved section of buried pipeline would, of course, provide a leakage site for the pipeline contents.

FIG. 3 also shows that the cables protruding from the ends of the module, are adapted for field hook up to adjacent modules by stop sleeves to permit easy "feel" hook-ups at the construction site using the oval sleeve crimp (also shown).

FIG. 4A annd 4B show how the restraining cables 20 to 27 are positioned around the circumference of a liner pipe 19 section. Preferably the cables linking opposite ends of a pipe section to their each adjacent pipe section are offset 28 on the circumference as illustrated in FIG. 4 for pipe diameters of about 1-3 feet. Preferably, about 4 restraining cables link each adjacent section, as shown.

FIG. 5 shows detail of the restraining cable 30 connection across a gasketed joint 32, capable of articulation, as previously described. The design is most appropriate for installation in segments of a module linked at the factory. FIG. 6 shows a single restraining cable comprising a washer and ball end 32 and 34; and a stud 36, washer and nut end 38 and 40, for ease of installation. Many other embodiments of restraining cable could be used. The advantages of the present invention for restraining overarticulation include the very low profile o the reliner for insertion in the pipeline.

What is claimed is:

1. A method of buried pipeline rehabilitation utilizing a sectional polyethylene liner pipe adapted for lining curved pipelines with articulated gasketed-joints between sections thereof, each said section linked to adjacent sections by several attached restraining cables, said joints comprising a bell having a beveled lip formed on one end of each section of said liner pipe, a spigot having a beveled lip formed in the opposing end of each section of said liner pipe, and an annular gasket snugly joining each said bell and spigot, wherein the inner diameter of each of said joints is equal to the inner diameter of said liner pipe, the outer diameter of each of said joints is equal to the outer diameter of said liner pipe, and the outer diameter of said liner pipe is less than the inner diameter of said buried pipeline, such that there exists an annular space between said liner pipe and said buried pipeline, said method comprising the steps of:

a. creating an access pit by uncovering a portion of said buried pipeline and removing only that fraction of said portion of said pipeline which is approximately above the springline of said pipeline, thereby leaving the invert of said portion of said pipeline to convey the pipeline flow while rehabilitation proceeds;

b. inserting said sectional polyethylene liner pipe section-by-section into said invert with bell opposing spigot, and allowing each inserted section to convey said pipeline flow;

c. pushing each of said inserted sections into said buried pipeline to snugly form said gasketed joints and advance said polyethylene liner pipe into said buried pipeline; and d. injecting grout under pressure into the annular space between said polyethylene liner pipe and said buried pipeline.

2. A method according to claim 1 wherein said inserted sections comprise modules composed of several shorter sections of previously joined liner pipe, each said shorter section of liner pipe linked to its adjacent section of liner pipe in said module by several attached restraining cables, said several restraining cables disposed around the circumference of each said section to prevent overarticulation.

3. A method according to claim 1 wherein said polyethylene liner pipe is produced by the helical winding of polyethylene strips and reinforcing members on a rotating mandrel.

4. A method according to claim 3 wherein said polyethylene is high density polyethylene.

5. A method according to claim 1 wherein a portion of said buried pipeline is curved with a radius of curvature greater than about 10 feet.

6. A method according to claim 5 wherein said radius of curvature is about 20 feet or greater.

* * * * *